UNITED STATES PATENT OFFICE.

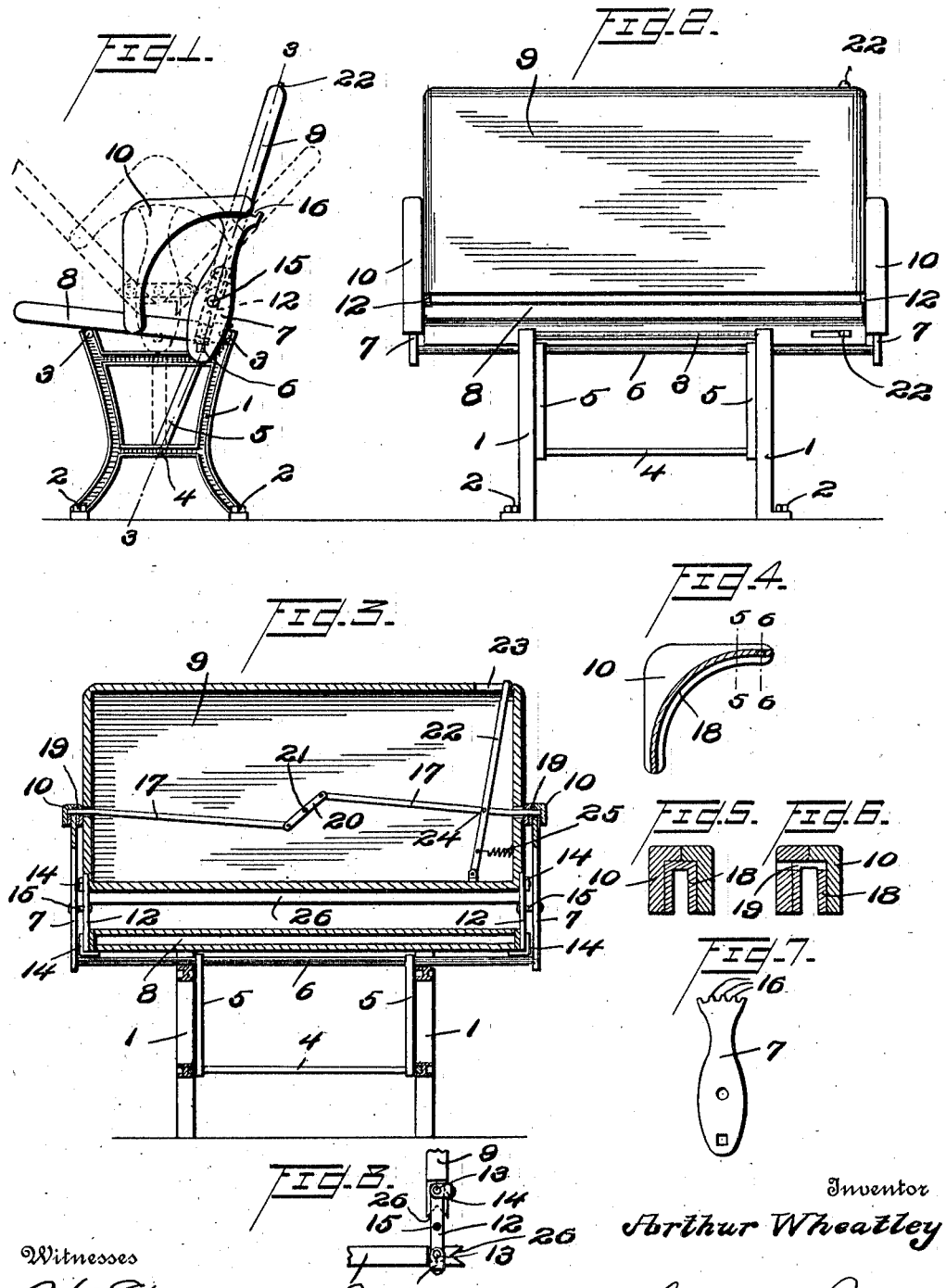

ARTHUR WHEATLEY, OF PHILADELPHIA, PENNSYLVANIA.

CAR-SEAT.

1,059,246.  Specification of Letters Patent.  Patented Apr. 15, 1913.

Application filed June 28, 1912. Serial No. 706,417.

*To all whom it may concern:*

Be it known that I, ARTHUR WHEATLEY, a citizen of the United States, residing at Philadelphia, in the county of Philadelphia and State of Pennsylvania, have invented certain new and useful Improvements in Car-Seats, of which the following is a specification.

My invention relates to improvements in car seats, the object of the invention being to provide a reversible car seat in which the two parts constituting the back and the seat are of the same dimension, yet are so connected and supported that the section constituting the seat is projected under the section constituting the back, so that a relatively high back and a relatively narrow seat is had.

In constructing car seats it is desirable to have a relatively high back and a narrow seat, so that as many of the seats may be provided in the car as possible to accommodate passengers. A reversible car seat therefore which employs sections of the same dimension alternately seat and back which permits the angular adjustment of the back, and which enables the sections to be quickly reversed is the broad purpose of my invention as will be hereinafter described.

With these and other objects in view, the invention consists in certain novel features of construction and combinations and arrangements of parts as will be more fully hereinafter described and pointed out in the claims.

In the accompanying drawings: Figure 1 is a view in end elevation illustrating in full lines my improvements in one normal position, and in dotted lines an intermediate position of the seat as it is being reversed from one position to another. Fig. 2 is a front elevation of Fig. 1. Fig. 3 is a view in longitudinal section on the line 3—3 of Fig. 1. Fig. 4 is a view in longitudinal section through one of the arms 10. Fig. 5 is a view in section on an enlarged scale on the line 5—5 of Fig. 4. Fig. 6 is a similar view in section on the line 6—6 of Fig. 4. Fig. 7 is a view in elevation of the segments 7, and Fig. 8 is a fragmentary view in end elevation illustrating the links connecting the two sections of the seat.

1, 1, represent supports which are preferably secured to the floor by screws 2, and are provided at their upper ends at front and rear with horizontal rods 3, the latter serving to limit the movement of the seat sections as seen in Fig. 1. The supports 1, 1, are connected by a rod 4, which latter has rotary mounting in the supports and is rigidly connected by links 5 with a horizontal rod 6. This rod 6 extends beyond the supports at both ends, and is fixed to segments 7. This segment may be secured in various ways, but the rod is shown angular which is a simple structure for compelling the segment to move with the rod.

The rods 4 and 6, links 5, and segments 7 constitute a pivoted frame which is adapted to be swung from one position to another when reversing the seat, and the latter comprises two sections 8 and 9 which are precisely alike and are pivotally connected by arms 10. These arms 10 are pivotally connected by rods 17 to the sections 8 and 9 at points removed from the side edges of the sections, and at points nearer the side edges of the sections, they are connected at both ends by links 12. These links 12 are in the form of bars with angular ends, and said bars are pivotally connected by rivets 13 in the bent over ends of straps 14. Said straps 14 are secured to the back of the seat sections 8 and 9 and form shoulders against which the links engage which limits the pivotal movement. These links 12 are pivotally connected midway between their ends with the segments 7 by means of pins 15, and the free end of the segments are provided with notches 16 to receive rods 17 and lock the parts against movement.

The notched ends of the segments 16 ride in metal channels 18 which are secured in the arms 10 and are curved in the arc of a circle. These channels 18 serve to hide the greater portion of the segments, and at their ends they are provided with openings 19 through which the rods 17 project. These rods 17 which are in both sections 8 and 9, are connected at their inner ends by a lever 20 which is fulcrumed between its ends as shown at 21 so that the movement of one rod 17 causes a movement of the other rod. Various mechanisms may be provided for moving these rods. A simple form is illustrated in which a lever 22 is pivotally connected at one end within the section, and at its other end projects through a slot 23 in the section, so that it may be readily grasped and operated. This lever 22 is connected between its ends to one of the rods 17 as shown at 24, so that when the lever 22 is moved, both rods will be operated. A coiled spring 25 is connected to the lever 22 and serves to hold both rods 17 normally projected in operative engagement with the segments 7. When the lever 22 is moved inwardly, the rod 17 will be withdrawn from the notches in the segment, and the section may be adjusted to give to the back section any desired incline or the sections may be reversed. It is to be understood, of course, that both sections are provided with rods 17 and levers 22, so that the parts will operate alike in both positions.

Fig. 1 shows the seat in one position, and I would call attention to the fact that when in such position, the back is elevated by means of the links 12 above the seat section, so that a relatively high back is had, and as the back section is located above the seat section, the seat section is comparatively narrow, and its rearward movement is limited by one of the rods 3 which is positioned in the grooved edge 26 of the section, while the other rod 3 supports the seat section at the desired incline. To reverse the seat, the levers 23 on the sections are moved and the sections swung to the position shown in dotted lines in Fig. 1. During this movement, the segments 7 ride through the channels 18 of the arms 10 and a continued movement will exactly reverse the parts shown in Fig. 1, so that the section 9 will constitute the seat and the section 8 the back. The sections are effectually locked against accidental movement by means of the rods 17 and segments 7, and any desired adjustment of back may be had as above explained.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A car seat comprising supports, a pivoted frame on the supports, two seat sections, links pivotally connecting the seat sections, and said links pivotally connected between their ends to said frame, substantially as described.

2. A car seat comprising supports, a pivoted frame on the supports, two seat sections, links pivotally connecting the seat sections, said links pivotally connected between their ends to said frame, arms pivotally connecting the sections, segments on said frame, and devices in the sections engaging the segments, substantially as described.

3. A car seat comprising supports, a pivoted frame on the supports, two seat sections, links pivotally connecting the seat sections, said links pivotally connected between their ends to said frame, arms pivotally connecting the sections, segments on said frame, devices in the sections engaging the segments, channel bars supported by the arms, and said segments movable through said channel bars, substantially as described.

4. A car seat comprising supports, a frame pivotally connected to the supports, segments on the frame, links pivotally connected between their ends to the segments, seat sections pivotally connected at the ends of the links, said links having angular ends, straps secured to the seat sections and confining the angular ends of the links, and rods on the supports engaging the edge and bottom of the seat section, substantially as described.

5. A car seat comprising supports, a frame pivotally connected to the supports, segments on the frame, links pivotally connected between their ends to the segments, seat sections pivotally connected at the ends of the links, said links having angular ends, straps secured to the seat sections and confining the angular ends of the links, rods on the supports engaging the edge and bottom of the seat section, arms pivotally connecting the seat sections, channel bars in said arms through which the segments move, and locking devices in the sections engaging the segments, substantially as described.

In testimony whereof I have signed my name to this specification in the presence of two subscribing witnesses.

ARTHUR WHEATLEY.

Witnesses:
C. R. ZIEGLER,
S. W. FOSTER.

---

Copies of this patent may be obtained for five cents each, by addressing the "Commissioner of Patents Washington, D. C."